United States Patent [19]

Hagenbuch

[11] Patent Number: 4,621,858
[45] Date of Patent: Nov. 11, 1986

[54] APPARATUS AND METHOD FOR A ROTATABLE TAILGATE ASSEMBLY HAVING SERVICE AND OUT-OF-SERVICE POSITIONS

[76] Inventor: LeRoy G. Hagenbuch, 4602 N. Rosemead, Peoria, Ill. 61604

[21] Appl. No.: 656,078

[22] Filed: Sep. 28, 1984

[51] Int. Cl.4 .............................................. B60P 1/26
[52] U.S. Cl. ............................... 296/56; 298/23 MD; 298/23 DF
[58] Field of Search .................... 296/50, 56, 184, 100, 296/101; 298/23 R, 23 DF, 23 MD, 38

[56] References Cited

U.S. PATENT DOCUMENTS

| | | | |
|---|---|---|---|
| 3,272,552 | 9/1966 | Park | 298/23 MD |
| 3,751,112 | 8/1973 | Hagenbuch | 296/50 X |
| 3,905,493 | 9/1975 | Logue | 296/56 X |
| 4,050,734 | 9/1977 | Richard | 296/100 X |
| 4,323,279 | 4/1982 | Domes et al. | 296/56 X |
| 4,348,055 | 9/1982 | Meisner et al. | 296/56 X |

FOREIGN PATENT DOCUMENTS

| | | | |
|---|---|---|---|
| 913876 | 6/1954 | Fed. Rep. of Germany | 298/23 MD |
| 98789 | 4/1940 | Sweden | 298/23 DF |
| 595516 | 12/1947 | United Kingdom | 298/23 DF |

Primary Examiner—Randolph A. Reese
Assistant Examiner—Russell D. Stormer
Attorney, Agent, or Firm—Leydig, Voit & Mayer

[57] ABSTRACT

A subassembly is provided for the pivotal body of a heavy-duty truck comprising a tailgate assembly which rotates between service and out-of-service positions in order to provide a truck body having a dual volume capacity. The tailgate assembly includes opposing side beams attached at their first ends to a tailgate which forms a back wall of the truck body when the assembly is in its service position. Pivot means couple the opposing side beams to the opposing side walls of the truck body such that the tailgate assembly may be rotated about an axis of rotation between its service and out-of-service positions. Means are provided for rotating the tailgate assembly about its axis of rotation wherein the rotating means advantageously utilizes the changing position of the center of gravity of the tailgate assembly as it rotates between positions.

8 Claims, 13 Drawing Figures

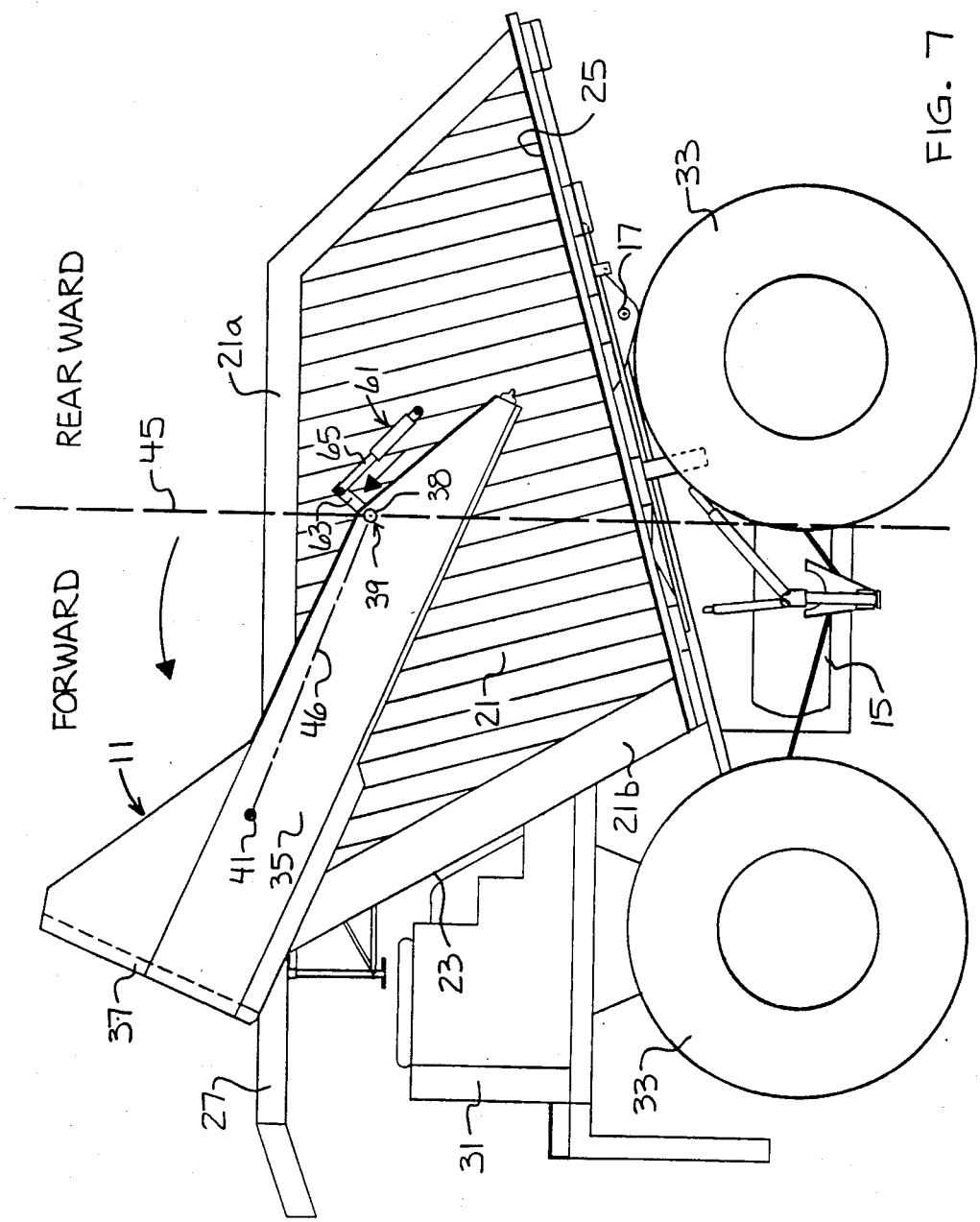

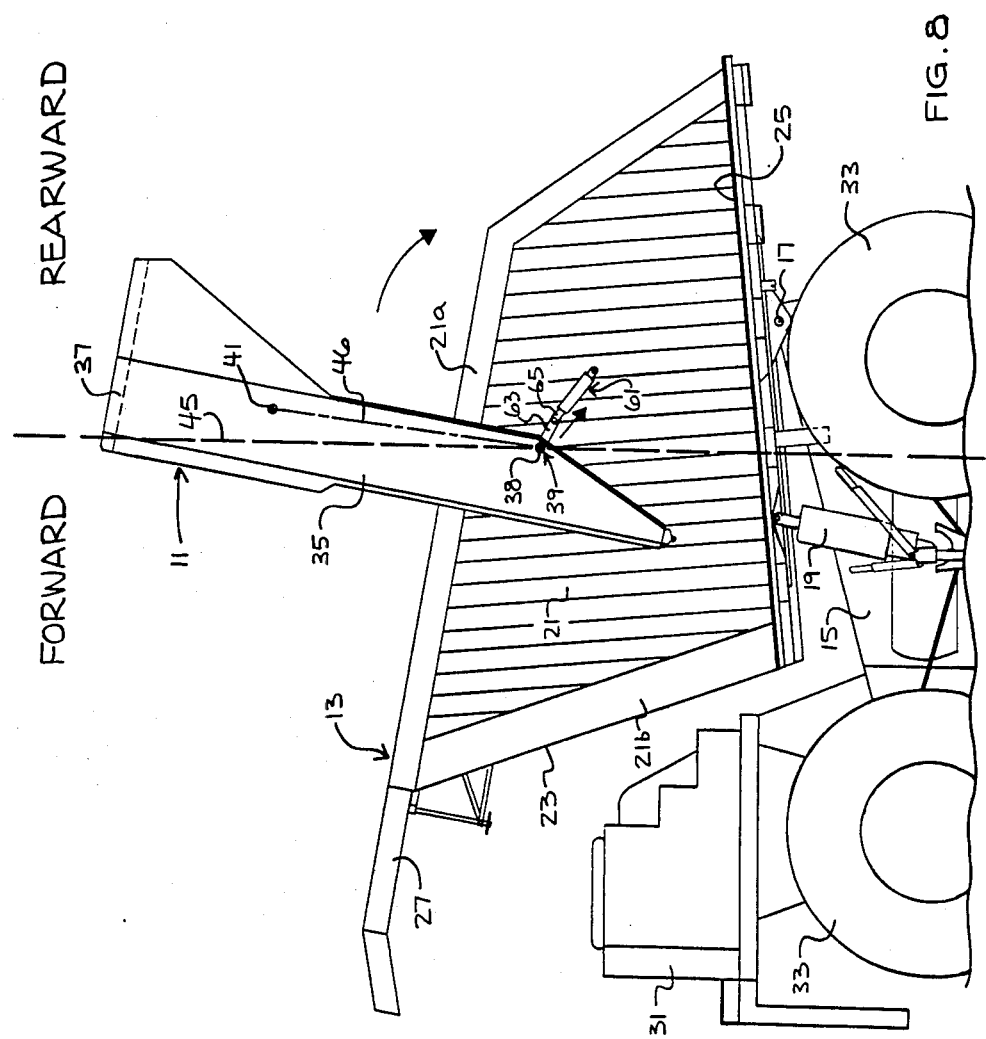

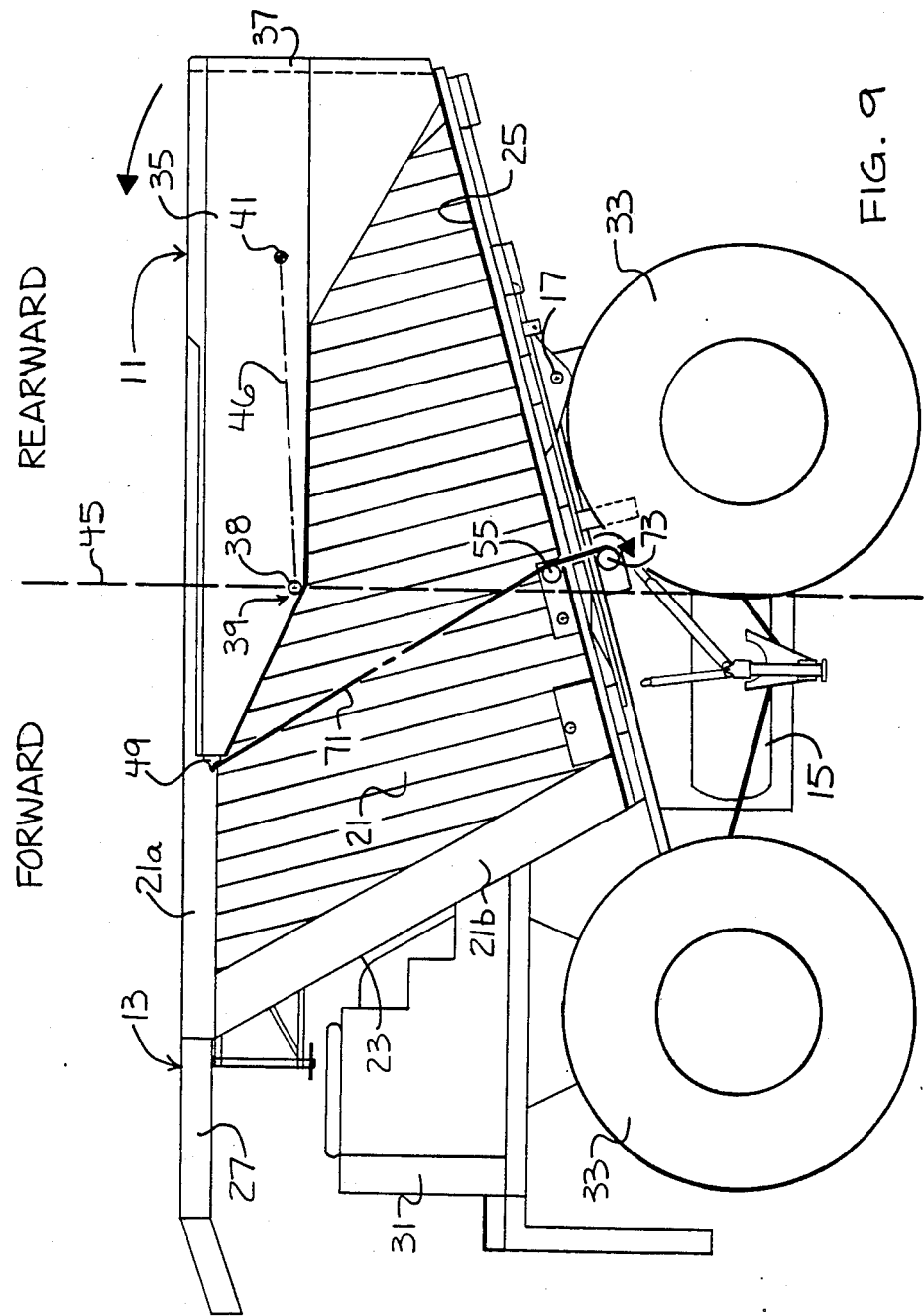

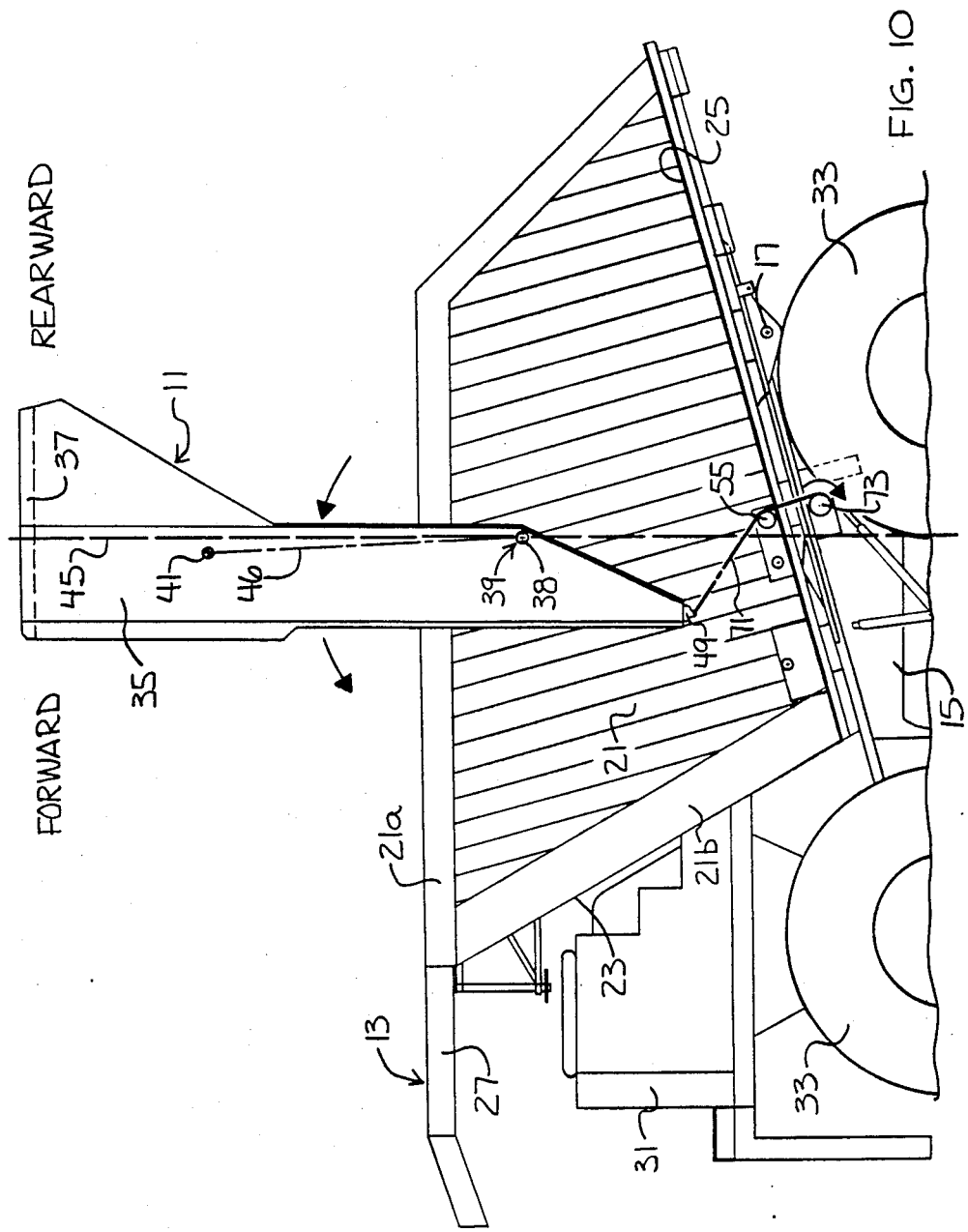

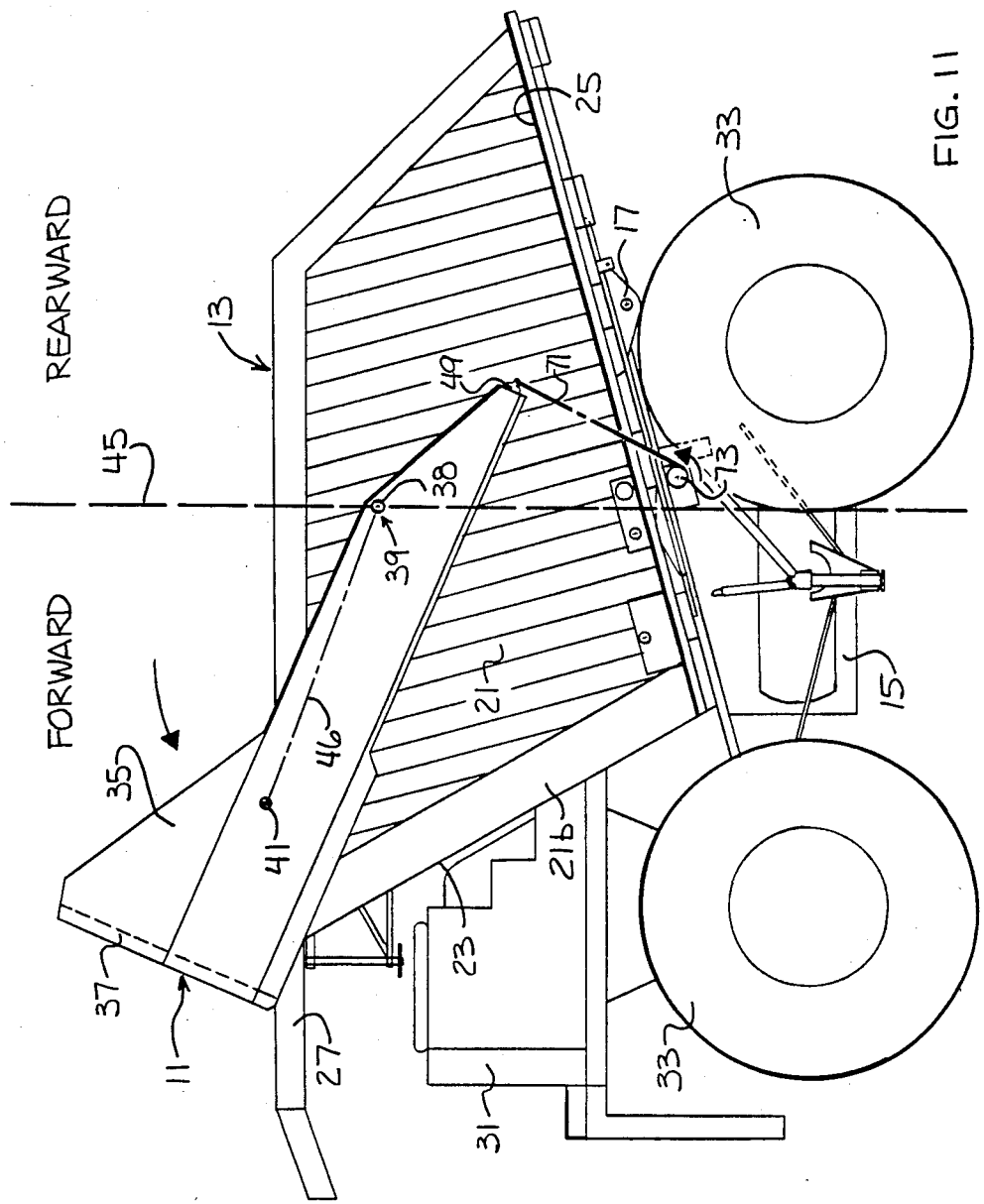

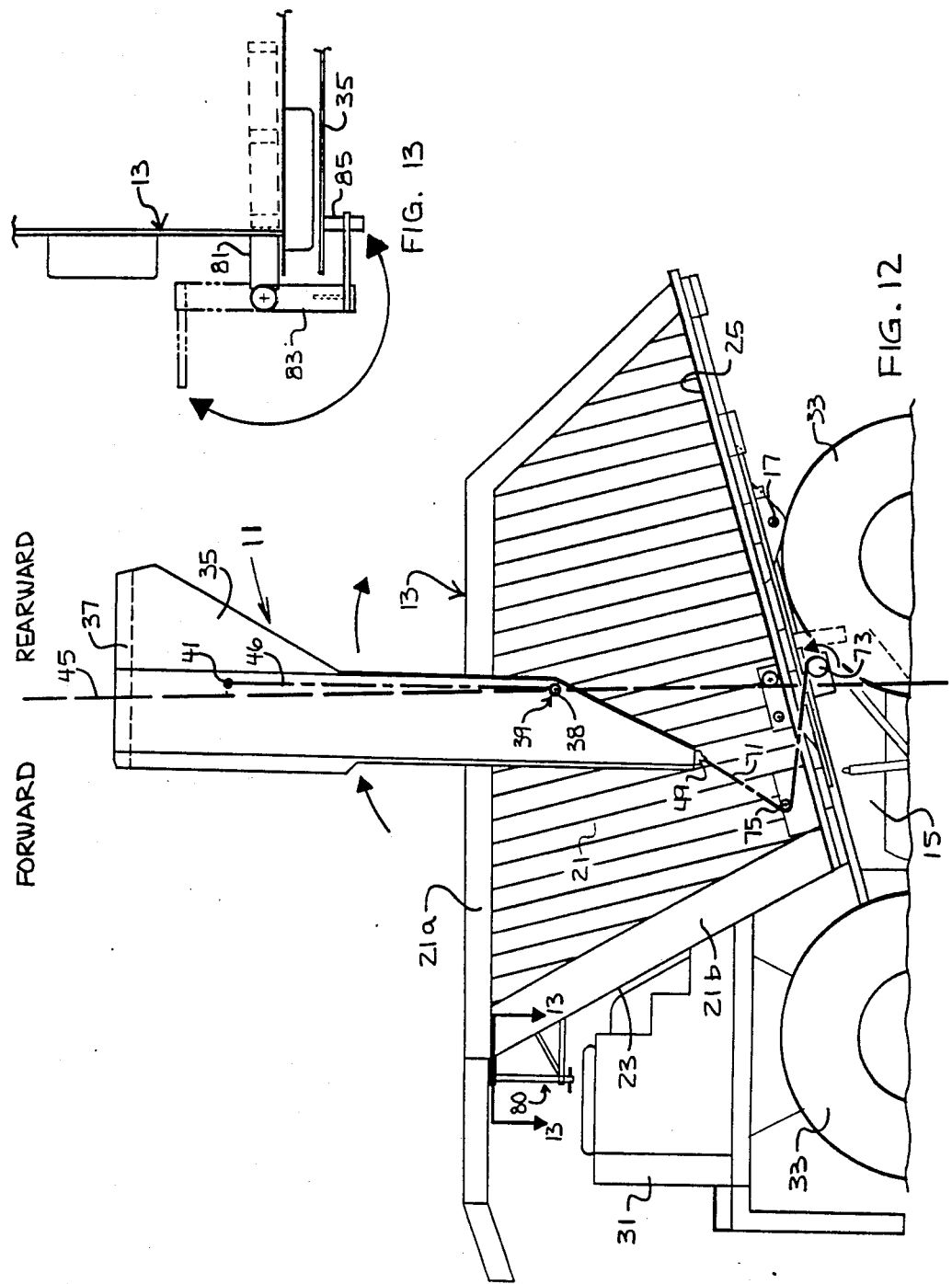

APPARATUS AND METHOD FOR A ROTATABLE TAILGATE ASSEMBLY HAVING SERVICE AND OUT-OF-SERVICE POSITIONS

TECHNICAL FIELD OF THE INVENTION

The present invention relates generally to heavy-duty, off-road trucks and, more particularly, to the construction of the bodies for these trucks.

BACKGROUND

Often, off-road trucks are subjected, during their routine use, to weight loads which differ greatly because of different material density and/or the ability of some material to more tightly pack when loaded into the truck body. In the working environment of a coal mining site, a truck may be called upon to haul either coal or overburden. Overburden is the earth material which must be removed in strip mining to expose the coal for removal. Typically, the overburden material has a greater density than the coal it covers. As a result of this difference in density, truck bodies which are always filled to their full volume capacity may carry weight loads which exceed the weight capacity of the truck.

By reducing the volume capacity of the truck body, the weight overloading problem can be eliminated. But, by reducing the volume capacity of the truck body, the truck hauls less than its full weight capacity of the lighter density coal. Therefore, the mine operator faces the unpleasant choice of either operating his trucks inefficiently (i.e., smaller volume bodies which hold less coal by weight than the truck is capable of holding) or, alternatively, risk overloading the truck (i.e., larger volume bodies which hold the full weight capacity of coal but which can be weight overloaded if fully loaded with heavier overburden).

One solution to the foregoing problem has been to employ a fleet of trucks comprising two types of truck bodies. One group of trucks is equipped with with smaller volume bodies for use in connection with hauling overburden. A second group of trucks is equipped with larger volume bodies for use in connection with hauling coal. Unfortunately, the dedication of a truck to a particular type of hauling task (i.e., hauling overburden or coal) reduces the versatility of the operator's fleet. During particular times of a mining cycle there may be a need for more trucks to haul overburden and at other times a need for more trucks to haul coal. When these times occur, the mine operator is in a situation where he must use a truck intended to haul one type of load (e.g., overburden) to haul another type of load (e.g., coal). Obviously, dedicating the truck fleet to groups intended for different types of hauling reduces the flexibility of the fleet and introduces the possibility of inefficient operation of the truck fleet.

One prior art solution to the problem of reduced flexibility of a truck fleet using truck bodies of different volume capacities has been to add a tailgate to the smaller capacity bodies in order to provide the bodies with means to increase their capacity if desired. Specifically, off-road, heavy-duty trucks are commonly equipped with bodies having beds which are angled with respect to a horizontal plane. The truck beds slope from a high point at the rear of the truck bodies to a low point at the front of the bodies. By providing bodies having the foregoing beds, loads can be carried by the bodies without necessitating separate tailgates for the bodies. By adding tailgates to the bodies, the load carrying capabilities of the bodies can be substantially increased. Therefore, many mine operators have equipped their truck fleet with smaller volume truck bodies which include tailgates for increasing the volume capacities of the bodies. When the tailgates are not used to retain loads, the trucks are operating with a smaller volume body suitable for safely hauling overburden. By using the tailgates to retain loads, the trucks are operating with a larger volume body suitable for the efficient hauling of coal.

Unfortunately, the addition of a tailgate to a truck body makes it difficult to control the exact loading of the truck when overburden is being hauled. Without the tailgate, the volumetric loading limit could be easily determined by visually monitoring the level of overburden by way of the rear opening of the truck body. With the addition of a tailgate, the loader operator can no longer make a visual estimation. Instead, he must now guess at the appropriate load.

In addition to the foregoing disadvantages of a tailgate, the tailgate also hinders the loading of a truck since a loading shovel must lift its bucket above the lowered tailgate and down into the bed of the body. For loading coal, this up and then down loading movement of the shovel is justified because of the additional load capacity provided by the tailgate. But, when the body is carrying overburden, the tailgate is not providing any additional capacity. In fact, since the loading shovel must raise the heavy buckets of overburden an additional height equal to that of the tailgate (e.g., approximate seven feet), the tailgate is actually a hindrance to the hauling of overburden. Moreover, because the tailgate requires overburden be raised relatively high above the body bed in order to clear the tailgate and load the truck, a risk is created that the overburden will be dropped into the truck body from a height which may, with continual usage, damage the truck frame and/or body.

SUMMARY OF THE INVENTION

It is a general object of this invention to provide a truck body for heavy-duty, off-road trucks which efficiently and safely hauls loads of different volumes and material densities. In this connection, it is a more specific object of this invention to provide a truck body for heavy-duty, off-road trucks which utilizes a tailgate without introducing inefficiencies into the hauling routine and without creating a risk of overloading the truck with high density material.

It is another object of the invention to provide an improved tailgate for the truck body of a heavy-duty, off-road truck which does not interfere with the loading of overburden and which does not create a risk of damaging the truck when loaded with overburden.

It is yet another object of the invention to provide the foregoing objectives while providing a tailgate which increases the volumetric capacity of a truck body for a heavy-duty, off-road truck.

Other objects and advantages of the invention will be apparent from the following detailed description and the accompanying drawings.

In accordance with the invention, a subassembly for the pivotal body of a heavy-duty truck is provided that includes a tailgate assembly which rotates between service and out-of-service positions. The tailgate assembly includes opposing side beams attached at their first ends to a tailgate. Pivot means couple the opposing side beams to opposing side walls of the truck body such that the tailgate assembly is capable of rotating about an axis of rotation intersecting both side walls. The tailgate assembly has a center of gravity intermediate the tailgate and the axis of rotation of the assembly. Means are provided for rotating the tailgate assembly about the axis of rotation from its service position to the out-of-service position in which the tailgate assembly rests on the canopy of the body.

BRIEF DESCRIPTION OF THE DRAWINGS

FIG. 7 is a side view of the truck frame and body of FIG. 5 with the tailgate assembly lowered to an out-of-service position on the canopy of the truck body from its position in FIG. 6;

FIG. 8 is a side view of the truck frame and body of FIG. 5 with the tailgate assembly moved to a raised position from its position in FIG. 7;

FIG. 9 is a side view of a truck frame and a truck body in its lowered position incorporating a tailgate assembly according to a third embodiment of the invention wherein the tailgate assembly is in its service position;

FIG. 10 is a side view of the truck frame and body of FIG. 9 with the tailgate assembly moved to a raised position from its position in FIG. 9;

FIG. 11 is a side view of the truck frame and body of FIG. 9 with the tailgate assembly lowered to an out-of-service position on the canopy of the truck body from the assembly's position in FIG. 10;

FIG. 12 is a side view of the truck frame and body of FIG. 9 with the body and tailgate assembly moved to a raised position from its position in FIG. 11; and FIG. 13 is a plan view of a locking mechanism for securing the tailgate assembly to the canopy when the tailgate assembly is in its out-of-service position taken along the line 13—13 in FIG. 12.

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention as defined by the appended claims.

DESCRIPTION OF THE PREFERRED EMBODIMENTS

Figure 1:
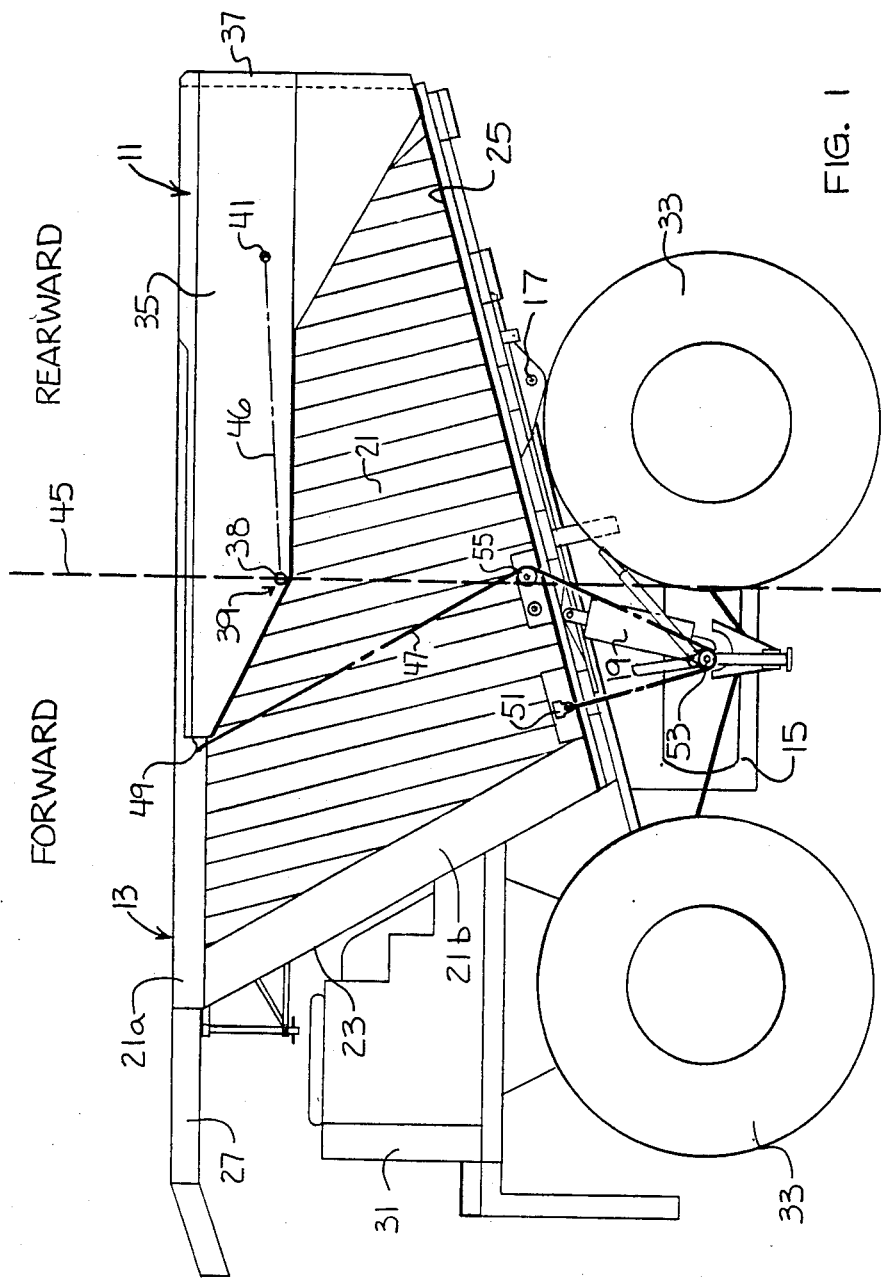
FIG. 1 is a side view of a truck frame and a truck body in its lowered position incorporating a tailgate assembly according to a first embodiment of the invention wherein the tailgate assembly is in its service position.

Turning to the drawings, and referring first to FIG. 1, a truck is illustrated with a tailgate assembly 11 mounted on the side walls of the truck body 13. The truck body 13 is mounted on an off-road truck frame 15 for pivoting about an axis 17. A hydraulic piston 19 operates the truck body 13 about the axis 17 between raised and lowered positions. Structurally, the truck body 13 consists of steel panels which form the shape of the body and beams 21a and 21b which provide the structural framework for the body. The truck body 13 consists of side walls 21 (only one is shown in FIGS. 1-12), a front wall 23, a bed 25 and a canopy 27 integrally attached to the top of the front wall and extending over the cab 31 of the truck.

Supporting the truck frame 15 are tires 33 connected for rotation to the frame by wheel axles (not shown). The tailgate assembly 11 includes side beams 35 (only one is shown) connected to a tailgate 37 which cooperate to rotate the tailgate assembly about an axis of rotation 38 defined by the pivot means 39. The tailgate assembly 11 has a center of gravity 41 located intermediate the tailgate 31 and the axis of rotation 38 for the tailgate.

Since the truck of the illustrative embodiments is symmetrical about its longitudinal axis, many of the elements identified in the side views of FIGS. 1-12 have complementary elements on the opposite side of the truck. For example, the truck body has two opposing side walls 21 and the tailgate assembly 11 has two opposing side beams 35 and pivot means 39. It will be understood that reference to plural elements where only one is show (e.g., side beams 35 or side walls 21) indicates a complementary element is located on the side of the truck not shown.

In accordance with the invention, the tailgate assembly 11 is moved from its service position (shown in FIG. 1) to an out-of-service position (shown in FIG. 3) by rotating the tailgate assembly about its axis of rotation 38 to a resting position on the canopy 27 of the truck body 13. By providing an out-of-service position for the tailgate assembly 11 atop the canopy 27, the truck body 13 can be quickly and easily converted to a smaller-capacity body for use in hauling overburden or other high density material. In order to convert the smaller-capacity body back to a larger-capacity body having a tailgate, the tailgate assembly 11 is rotated in a clockwise direction about the axis of rotation 38 from its out-of-service position illustrated in FIG. 3. Continued clockwise rotation as illustrated by the raised tailgate assembly 11 in FIG. 4 results in the assembly returning to the service position illustrated in FIG. 1.

The tailgate assembly 11 has a center of gravity 41 at a location intermediate the axis of rotation 38 and the tailgate 37. Accordingly, in a raised position, the tailgate assembly 11 has a natural tendency to rotate in a clockwise direction when the center of gravity 41 is in a position rearward of an imaginary vertical plane 45 passing through the axis of rotation 38. In contrast, the tailgate assembly 11 has a natural tendency to rotate in a counterclockwise direction when the center of gravity 41 is in a position forward of the imaginary vertical plane 45.

Means for rotating the tailgate assembly 11 are provided which rotate the assembly by controlling the net moment on the assembly about the axis of rotation 38. In order to control the rotation of the tailgate assembly 11, the means for rotating must overcome the gravitational force in order to raise the assembly and, after the center of gravity 41 of the assembly has passed through the vertical plane 45, the means for rotating must reduce to a force less than the gravitational force in order to continue rotation of the assembly in the same direction. But the reduced force must be such as to allow the gravitational force to lower the tailgate assembly without the assembly slamming into the canopy 27 (out-of-service position) or truck bed 25.

A line joining the axis of rotation 38 of the tailgate assembly 11 with the center of gravity 41 of the tailgate assembly can be considered a reference line 46 for the purpose of examining the relative forces controlling the movement of the tailgate assembly. As the means for rotating the tailgate assembly 11 applies a downward force on the side beam 35 of the tailgate assembly at a location opposite the center of gravity 41 with respect to the axis of rotation 38, the net moment about the axis of rotation is in a counterclockwise direction, i.e., the gravitational moment is less than the moment associated with the means for rotating. As the tailgate assembly 11 rotates in a counterclockwise direction in FIGS. 1-3, the moment at the center of gravity 41 decreases until, at the zenith of the tailgate's rotation, the moment switches from the rearward side to the forward side of the reference line 46. When this switch occurs, the natural tendency of the tailgate assembly 11 to fall from its raised position switches from a rearward direction to a forward direction in accordance with the change in the moment about the center of gravity 41.

In order to raise the tailgate assembly 11, the force associated with the center of gravity 41 is overcome by the means for rotating. After the tailgate assembly 11 has reached its zenith of rotation and the gravitational force has switched to the forward side of the reference line 46, the means for rotating compensates for the switch in direction of the gravitational force. Without compensating for the switch in direction of the gravitational force, the new direction of the force of gravity would complement the force from the means for rotating and, thereby, cause the tailgate assembly 11 to slam into its lowered position (either the service position or the out-of-service position). Therefore, the means for rotating reverses the direction of its force at approximately the same time during the rotation of the tailgate assembly 11 as the force of gravity changes from one side of the vertical plane 45 to the other side. In addition, the force from the means for rotating must now have a moment which is less than the moment associated with the force of gravity since a net moment is required in the same direction as the direction of the net moment during the lifting of the tailgate assembly 11. This continuity of the net moment assures that the tailgate assembly 11 will continue rotating to its resting position either atop the canopy 27 or on the truck bed 25 (depending on the direction of rotation).

Specifically, from the service position of the tailgate assembly 11, the means for rotating applies a force whose moment overcomes the moment at the center of gravity 41 until the tailgate assembly reaches its zenith of rotation. As the reference line 46 passes through the vertical plane 45, the means for rotating responds to the change in direction of the moment at the center of gravity from rearward to forward by reversing its moment and adjusting the magnitude of the moment in order to create a continuous net moment about the tailgate assembly such that the counterclockwise rotation of the tailgate assembly continues. In addition, the means for rotating must return the tailgate assembly 11 from its out-of-service position to its service position (clockwise rotation of the tailgate assembly) in the same manner it rotates the assembly from its service position to its out-of-service position.

In order to provide for a means for rotating the tailgate assembly 11 in the foregoing manner, three illustrative embodiments are shown in the drawings. Referring first to the illustrative embodiment shown in FIGS. 1-4, a cable or chain 47 is connected between the truck body and the tailgate assembly 11 and operates as the means for rotating the tailgate assembly in response to movement of the truck body from its lowered position to its raised or dump position. Specifically, the cable or chain 47 is fixedly attached at its ends to fixed points 49 and 51 on the side beam 35 and the truck body, respectively. In between these two endpoints, the cable or chain 47 is biased by a roller 53 carried on an outrigger off of the truck frame 15 and also by a roller 55 carried by a support off of the truck body 13.

Figure 2:
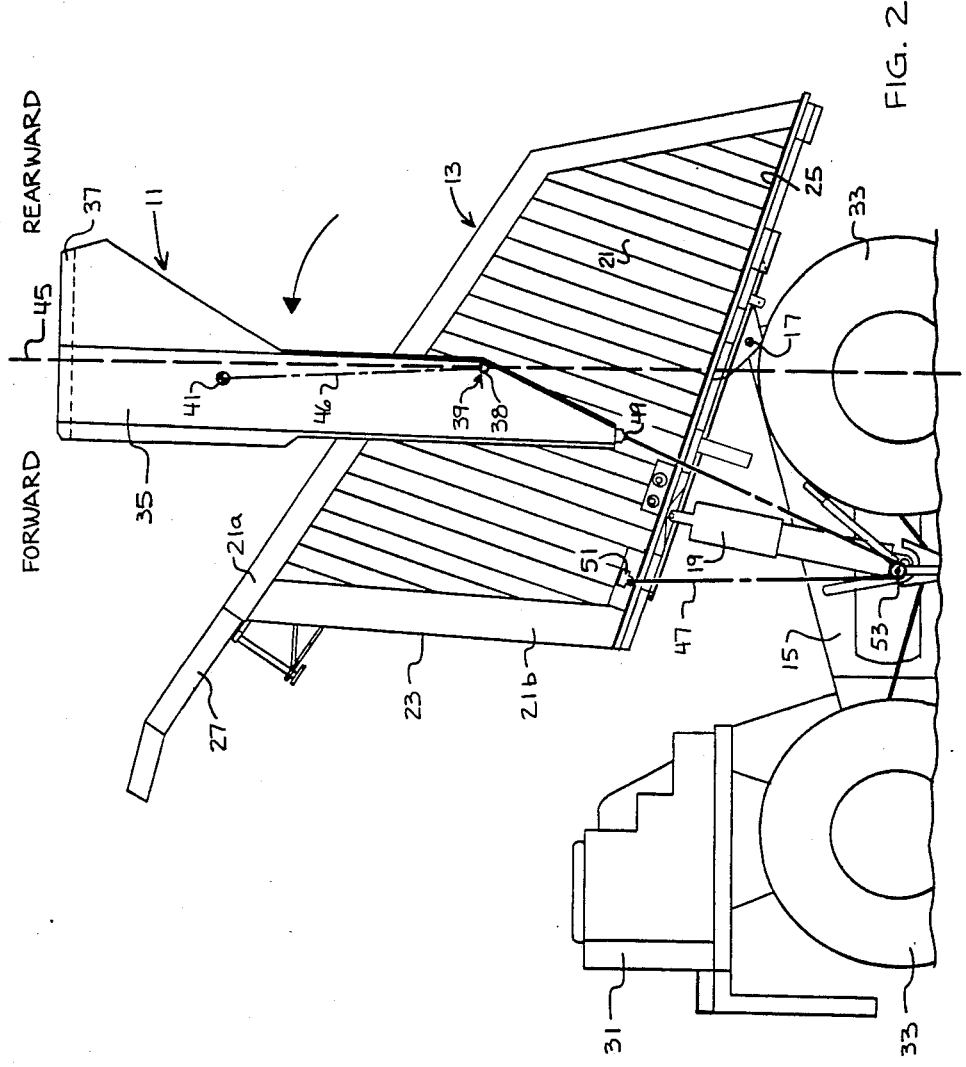
FIG. 2 is a side view of the truck frame and body of FIG. 1 with the body and tailgate assembly moved to raised positions from their positions in FIG. 1.
Figure 3:
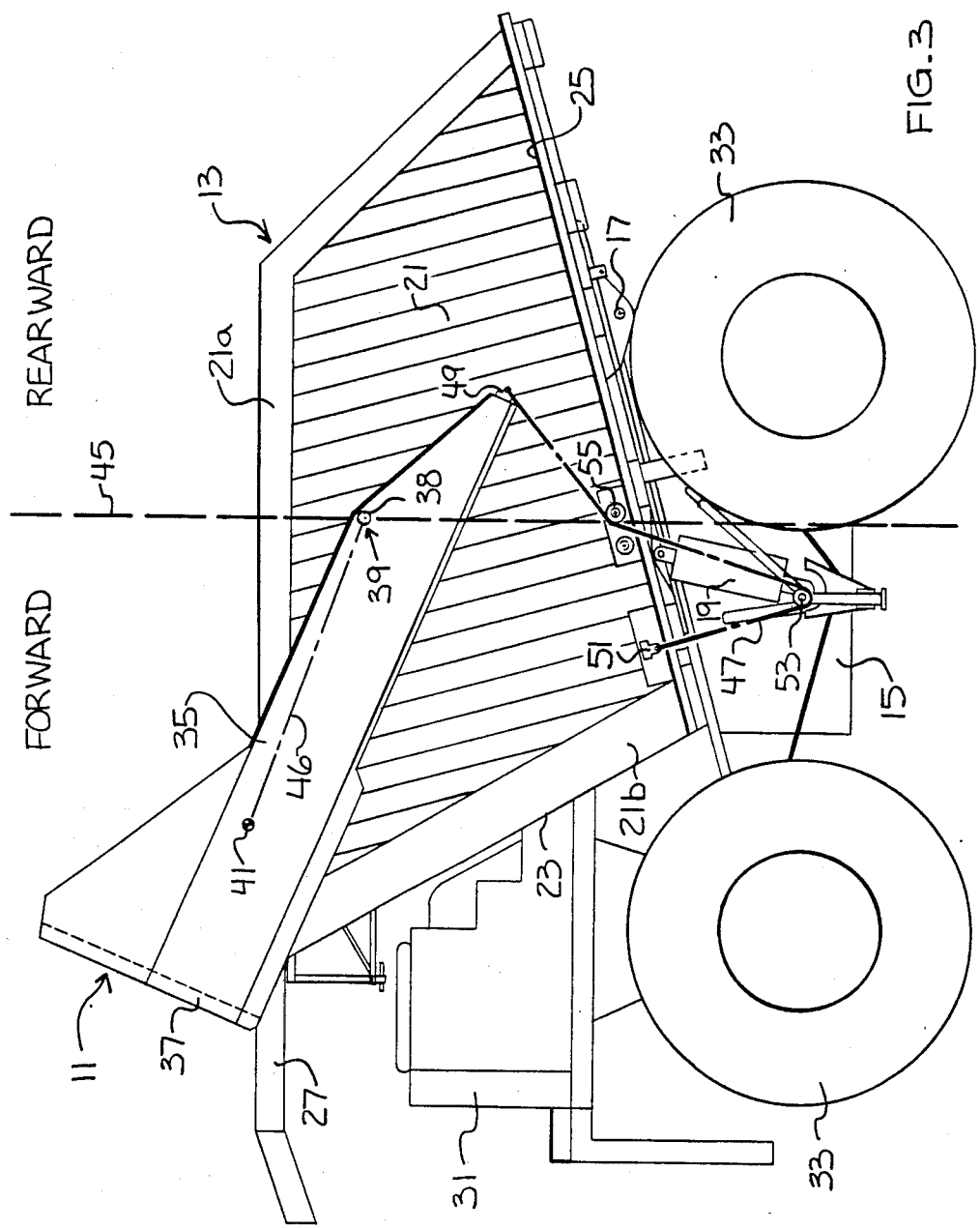
FIG. 3 is a side view of the truck frame and body of FIG. 1 with the body moved to a lowered position from its position in FIG. 2 and with the tailgate assembly lowered to an out-of-service position on the canopy of the truck body.
Figure 4:
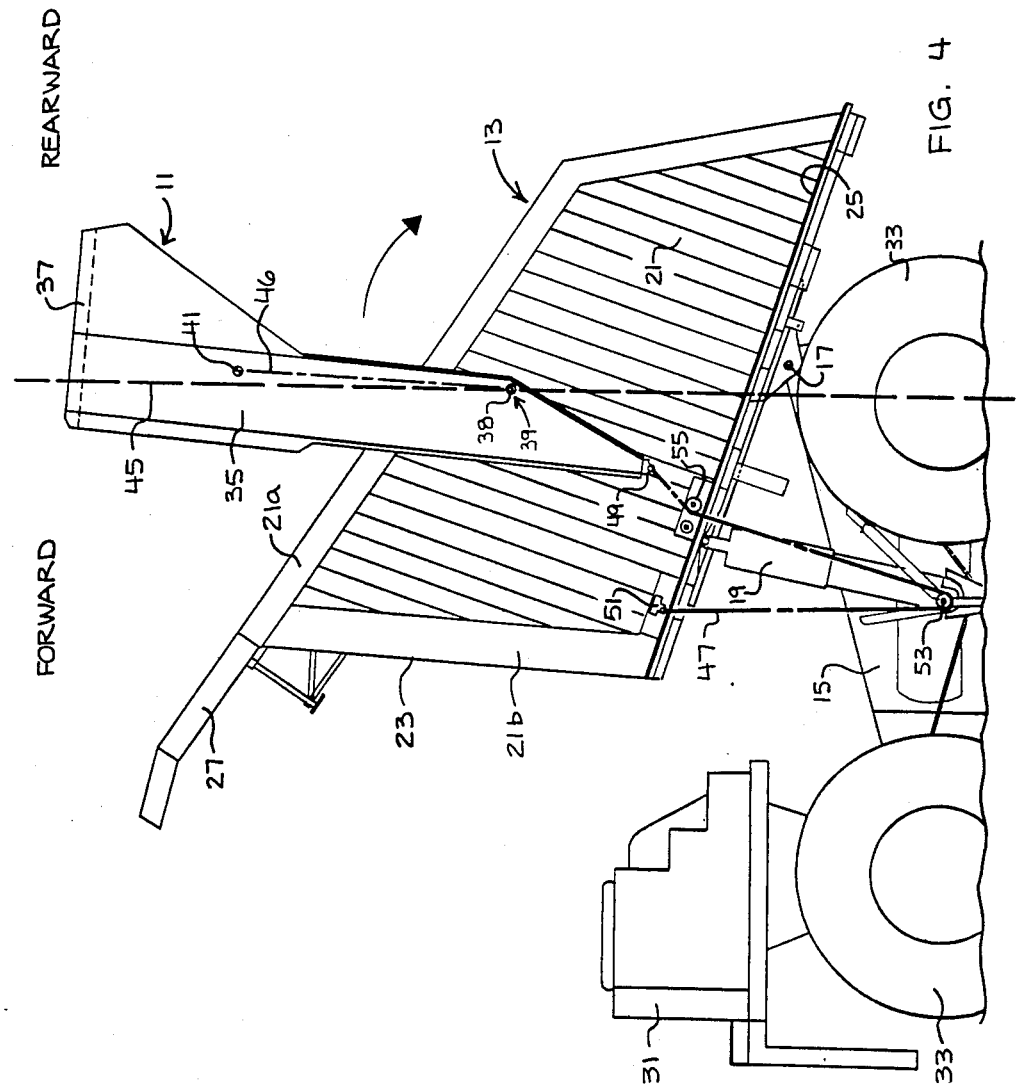
FIG. 4 is a side view of the truck frame and body of FIG. 1 with the body and tailgate assembly moved to raised positions from their positions in FIG. 3.
Figure 5:
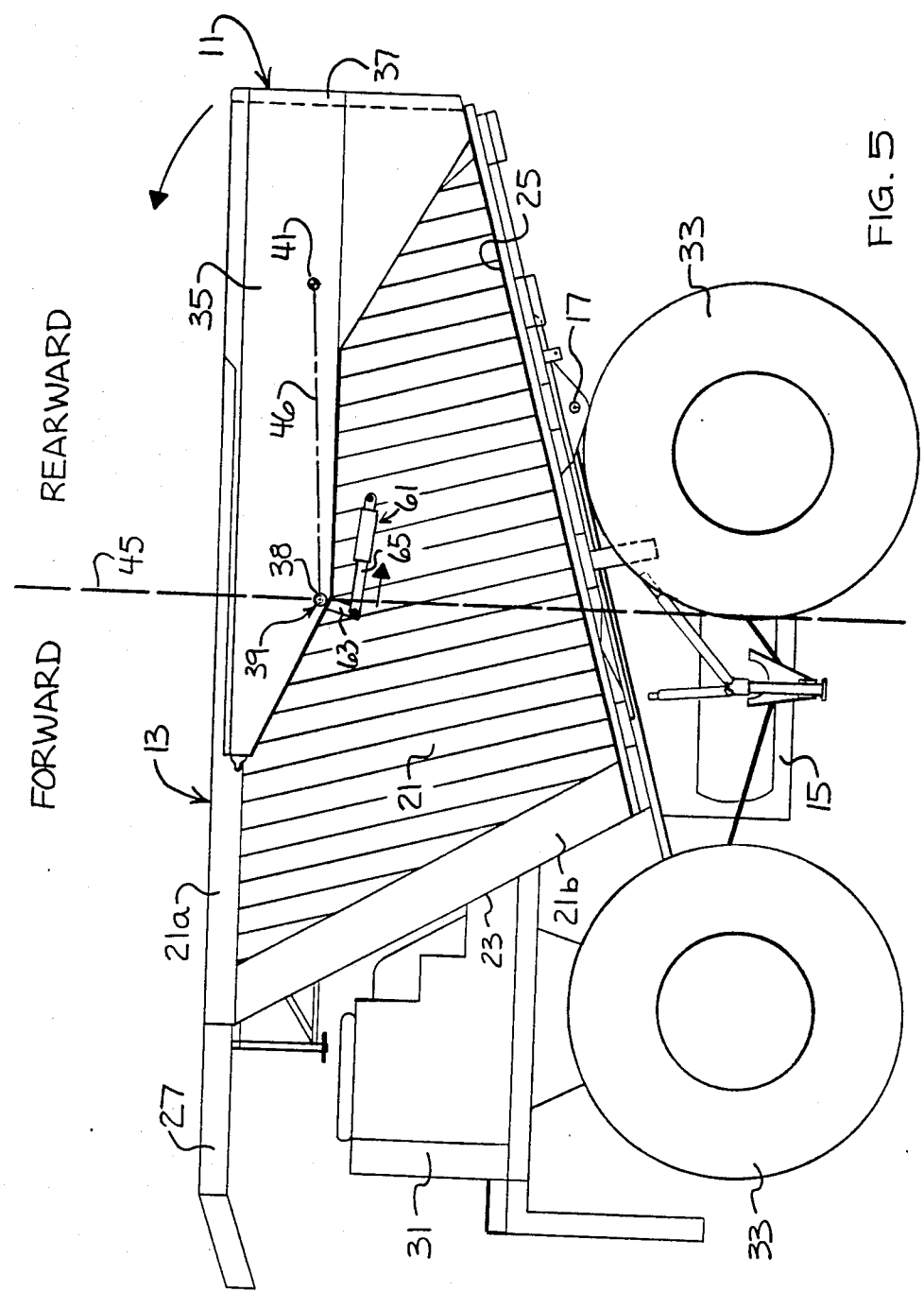
FIG. 5 is a side view of a truck frame and a truck body in its lowered position incorporating a tailgate assembly according to a second embodiment of the invention wherein the tailgate assembly is in its service position.
Figure 6:
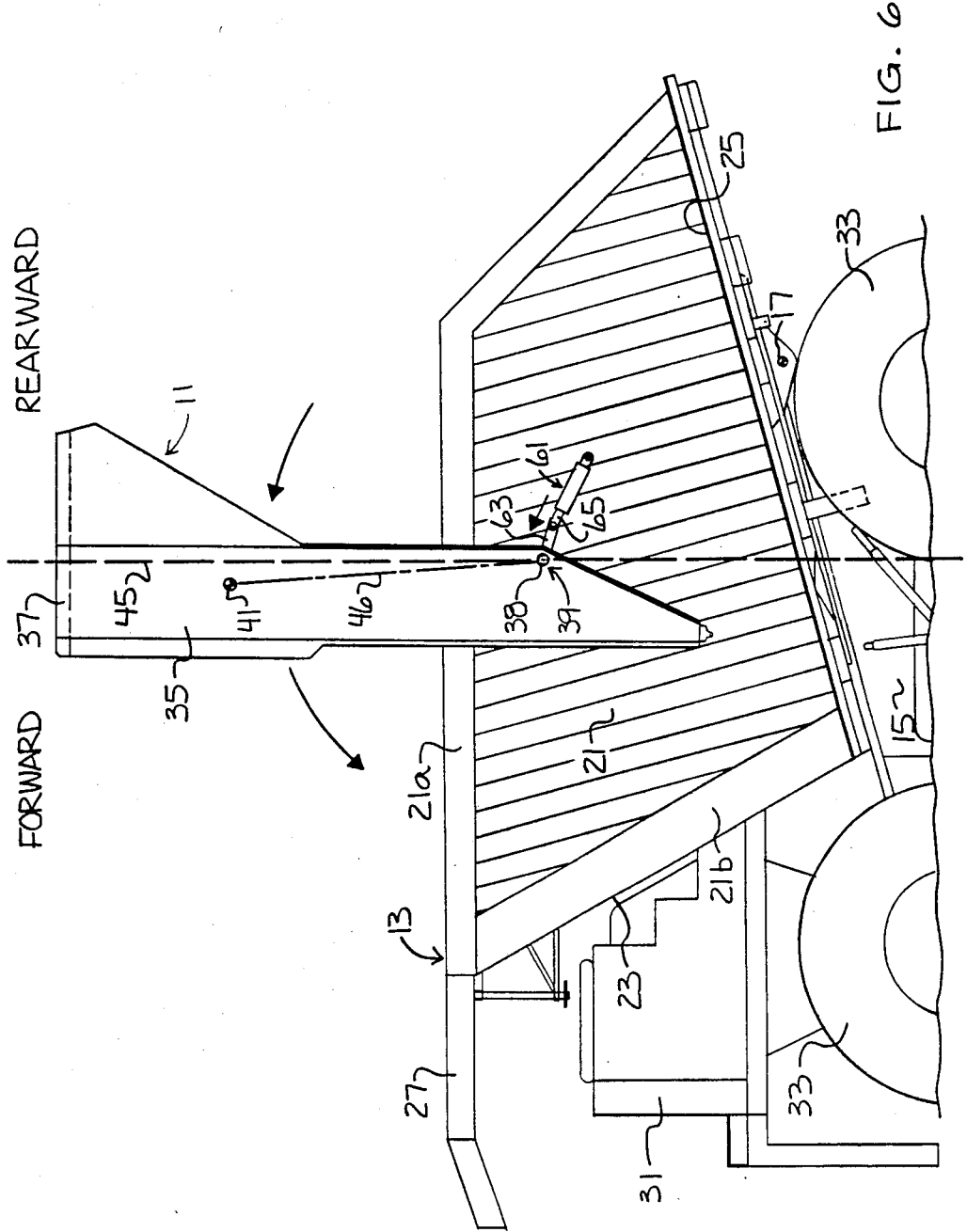
FIG. 6 is a side view of the truck frame and body of FIG. 5 with the body and tailgate assembly moved to a raised position from its position in FIG. 5.

As the truck body 13 pivots to its raised position, the cable or chain 47 is pulled about the rollers 53 and 55, and the tailgate assembly 11 responds by rotating in a counterclockwise direction as illustrated in FIG. 2. As the truck body is raised, the tailgate assembly rotates into a position such that the reference line 46 has passed through the vertical plane 45. Since the cable or chain 47 remains relatively taut during this rotation of the tailgate assembly 11 and pivoting of the truck body 13, the tailgate assembly does not fall toward the canopy 27 as it otherwise would if it were not supported in its raised position by the cable or chain 27. Accordingly, as the truck body 13 is moved from a raised position to its lowered position the cable or chain allows the tailgate assembly 11 to lower toward a rest position on the canopy 27 of the truck body.

In order to place the tailgate assembly 11 back into its service position, the cable or chain 47 is biased on the opposite side of the roller 55 on the truck body 13. With the cable or chain 47 repositioned, the tailgate assembly 11 is in a position, when the truck body 13 is raised, such that the center of gravity 41 of the assembly passes from a forward position of the imaginary vertical plane 45 to a rearward position of the plane. With the center of gravity 41 in a rearward position of the vertical plane 45, the lowering of the truck body 13 allows the tailgate assembly 11 to lower, under control of the cable or chain 47, to its service position.

Referring now to the second embodiment of the invention illustrated in FIGS. 5-8, the means for rotating the tailgate assembly 11 is provided by hydraulic piston assemblies 61 attached at their first ends to the side walls 21 of the truck body 13 and at their second ends to levers (arms) 63 of the side beams 35 of the tailgate assembly. As the arms 65 of the hydraulic piston assemblies 61 are retracted, the hydraulic piston assemblies and the arms 63 provide a net moment about the axis of rotation 38 of the tailgate assembly 11 which rotates the tailgate assembly in a counterclockwise direction.

At the end of the stroke of the arms 65 of the hydraulic piston assemblies 61, the center of gravity 41 of the tailgate assembly 11 has passed from a rearward position of the vertical plane 45 to a forward position of that plane. Accordingly, when the arms 65 of the hydraulic piston assemblies 61 are extended from their fully retracted position, the tailgate assembly 11 continues to be moved in a counterclockwise direction until the assembly rests upon the canopy 27 of the truck body 13. Because the center of gravity 41 of the tailgate assembly 11 passes to a position forward of the vertical plane when the arms 65 of the hydraulic piston assemblies 61 are in a fully retracted position, the subsequent extension of the arms 65 of the hydraulic piston assemblies will not return the tailgate assembly to its original position, but instead, continues to rotate the tailgate assembly in its counterclockwise direction.

In order to move the tailgate assembly 11 from its out-of-service position on the canopy 27 of the truck body 13 to its service position, the truck body is raised slightly from its lowered position. By slightly raising the truck body 13 from its lowered position (as shown in FIG. 7), the retraction of the arms 65 of the hydraulic piston assemblies 61 to their fully retracted positions will result in the center of gravity 41 of the tailgate assembly 11 passing through the vertical plane 45 thereby allowing a subsequent extension of the arms 65 to continue rotation of the tailgate assembly in a clockwise direction.

In the third alternative embodiment of the invention, the means for rotating the tailgate assembly 11 is provided by a cable 71 connected at one end to the side beam 35 of the tailgate assembly 11 and at another end to a winch 73. At an intermediate point of the cable 71, the cable is biased by the roller 55 (used in connection with the first embodiment of the invention). As the winch 73 coils the cable 71, the tailgate assembly 11 is rotated in a counterclockwise direction until the center of gravity 41 passes through the vertical plane 45. The tailgate assembly 11 then continues the counterclockwise rotation under the effect of gravity until the cable 71 is taut. At that point, the winch 73 then begins to uncoil the cable 71 in order to allow the tailgate assembly 11 to continue its counterclockwise rotation toward its final position atop the canopy 27 of the truck body 13 shown in FIG. 11.

Referring to FIG. 12, in order to return the tailgate assembly 11 to its service position, the cable 71 is biased against a roller 75 held on a support mounted to the truck body 13 wherein the roller is positioned differently from the position of the roller 55 used to rotate the tailgate assembly 11 in a counterclockwise direction. By changing the location of the biasing roller, the coiling of the cable 71 by the winch 73 locates the center of gravity 41 of the tailgate assembly 11 at a position rearward of the vertical plane 45 as the cable is coiled. Therefore, when the winch 73 uncoils the cable 71, the force of gravity causes the tailgate assembly 11 to continue rotating in a clockwise direction toward its service position. As an alternative to the biasing roller 75 for returning the tailgate assembly 11 to its service position, the truck body 13 is raised from its lowered position (as shown in FIG. 7) such that the coiling of the cable 71 by the winch 73 will result in the center of gravity 41 passing clockwise through the vertical plane 45 thereby allowing a subsequent uncoiling of cable 71 by winch 73 to continue rotation of the tailgate assembly 11 in a clockwise direction.

Still referring to FIG. 12, a canopy locking mechanism 80 is illustrated which holds the tailgate assembly 11 in its out-of-service position on the canopy 27. The locking mechanism 80 is fixedly attached to the front wall 23 of the truck body 13. As illustrated in FIG. 13, the locking mechanism 80 is mounted on a support 81 off of the truck body 13 in order that it may pivot between locked and unlocked positions. In order to lock the tailgate assembly 11 on the canopy 27, an L-shaped arm 83 of the locking mechanism 80 (as viewed in FIG. 13) is moved into an engagement position (solid lines) with a dog 85 extending from the side beam 35 of the tailgate assembly. The L-shaped arm 83 locks the tailgate assembly 11 over the canopy 27 by swinging into a position (as shown by the arrow in FIG. 13) wherein the arm 83 is over the dog 85 such that the tailgate assembly is biased against clockwise rotation as viewed in FIG. 12; therefore, the tailgate assembly 11 cannot lift away from its resting place on the canopy 27. By providing the locking mechanism 80, the tailgate assembly 11 can be rotated to its out-of-service position without fearing that the assembly may unintentionally and uncontrollably swing back to its service position. Without the locking mechanism 80, a combination of circumstances, individually or combined such as rough road conditions, steep grades, and at or near fill dump of truck body 13 could create a significant risk of unintentional clockwise movement of the tailgate assembly 11 from the canopy 27. Under extreme circumstances the tailgate assembly 11 may even uncontrollably rotate to its service position.

From the foregoing illustrative embodiments, it will be appreciated that the tailgate assembly 11 can be alternatively placed in a service position or an out-of-service position on the canopy 27 of the truck body 13 by way of rotating the tailgate assembly about the axis of rotation 38. The means for rotating the tailgate assembly 11 advantageously utilize the change in direction of the moment produced by the gravitational force as the tailgate assembly is rotated. Furthermore, the tailgate assembly 11 can be safely carried on the canopy 27 of the truck body 13 by providing the locking mechanism 80 described in connection with FIGS. 12 and 13. By utilizing the invention to provide a tailgate assembly with an out-of-service position, a more versatile heavy-duty truck is provided which can be safely used for both hauling overburden and coal at a mining site.

I claim:

1. A subassembly for the pivotal body of a heavy-duty truck wherein the body is supported by a truck frame and includes opposing side walls, a front wall and a canopy extending forward from the front wall over the cab of the truck, said subassembly comprising in combination;

a tailgate assembly including opposing side beams attached at their first ends to a tailgate;

pivot means coupling said opposing side beams to said opposing side walls such that said tailgate assembly can be rotated about an axis of rotation intersecting both side walls, said axis of rotation intersecting a vertical plane which divides said truck body into forward and rearward sides;

said tailgate assembly having a center of gravity intermediate said tailgate and said axis of rotation;

means for rotating said tailgate assembly about said axis of rotation from a service position to an out-of-service position in which said tailgate assembly rests on the canopy of said body; and said rotating means includes a cable or chain connected to said truck body at a first end, to said tailgate assembly at its second end and biased against a roller assembly mounted to said truck frame at a cable or chain location intermediate said first and second ends whereby movement of said truck body from lowered to raised positions draws said cable or chain in a first direction causing said tailgate assembly to rotate about its axis of rotation and subsequent movement of said truck body from raised to lowered positions draws said cable or chain in a direction opposite said first direction causing said tailgate assembly to continue rotating about its axis of rotation until said tailgate assembly rests on said canopy.

2. A subassembly for the pivotal body of a heavy-duty truck wherein hinges pivotally support the body on a truck frame and said body includes opposing side walls, a front wall and a canopy extending from the front wall over the cab of the truck, said subassembly comprising in combination;
   a tailgate assembly including opposing side beams attached at their first ends to a tailgate which forms a back wall of said truck body when said assembly is in a service position;
   pivot means coupling said opposing side beams to said opposing side walls such that said tailgate assembly can be rotated about an axis of rotation between resting positions;
   said tailgate assembly having a center of gravity intermediate said tailgate and said axis of rotation defining the location of an imaginary vertical plane;
   means for pivoting said truck body about hinges between raised and lowered positions;
   means for rotating said tailgate assembly responsive to the pivoting of said body;
   said means for rotating said tailgate assembly responsive to the pivoting of said body from its lowered position to its raised position such that said tailgate assembly is rotated from one of said resting positions to a raised position whereby the center of gravity of said tailgate assembly passes through said vertical plane; and
   said means for rotating said tailgate assembly responsive to the pivoting of said body from its raised position to its lowered position such that said tailgate assembly is rotated from said raised position to one of said resting positions whereby the center of gravity of said tailgate assembly does not pass through said vertical plane.

3. A subassembly as set forth in claim 2 wherein said resting positions include an out-of-service position and said service position wherein the tailgate assembly is supported by said canopy in its out-of-service position.

4. A subassembly as set forth in claim 2 wherein said means for rotating includes linkage interconnecting said body, frame and tailgate assembly which moves in a first direction in response to the pivoting of said truck body from said lowered to raised positions and moves in a second direction opposite said first direction in response to the pivoting of said truck body from said raised to lowered positions.

5. A subassembly as set forth in claim 4 wherein said linkage is a cable or chain connected to said truck body at a first end, to said tailgate assembly at its second end and slidably biased to said truck frame at an intermediate location.

6. A subassembly as set forth in claim 5 wherein said cable or chain is fixedly attached to said truck body and said tailgate assembly at its opposing ends and biased against a roller assembly mounted to said truck frame at a cable or chain location intermediate said opposing ends whereby movement of said truck body from lowered to raised positions draws said cable or chain in a first direction causing said tailgate assembly to rotate about said axis of rotation to said raised position such that said center of gravity passes through said imaginary vertical plane and subsequent movement of said truck body from raised to lowered positions draws said cable or chain in a direction opposite said first direction thereby causing said tailgate assembly to descend from said raised position without said center of gravity crossing said imaginary vertical plane until said tailgate assembly is in one of said resting positions.

7. A subassembly as set forth in claim 3 including;
   means for locking said tailgate assembly in the out-of-service position such that said tailgate assembly is not free to rotate about said axis of rotation.

8. A subassembly as set forth in claim 7 wherein said locking means includes a rotatable arm mounted to said truck body for engagement with a dog mounted to said tailgate assembly when said assembly is in its out-of-service position.

* * * * *